United States Patent
Howell et al.

(10) Patent No.: US 7,051,532 B2
(45) Date of Patent: May 30, 2006

(54) METHODS AND APPARATUS FOR FILM COOLING GAS TURBINE ENGINE COMBUSTORS

(75) Inventors: Stephen John Howell, West Newbury, MA (US); John Carl Jacobson, Melrose, MA (US); Timothy P. McCaffrey, Swampscott, MA (US); Barry Francis Barnes, Malden, MA (US)

(73) Assignee: General Electric Company, Schenecady, NY (US)

( * ) Notice: Subject to any disclaimer, the term of this patent is extended or adjusted under 35 U.S.C. 154(b) by 349 days.

(21) Appl. No.: 10/688,526

(22) Filed: Oct. 17, 2003

(65) Prior Publication Data
US 2005/0081527 A1   Apr. 21, 2005

(51) Int. Cl.
    *F23R 3/02* (2006.01)
(52) U.S. Cl. .............................. 60/772; 60/756; 60/757
(58) Field of Classification Search .................. 60/752, 60/755, 756, 757, 772
    See application file for complete search history.

(56) References Cited

U.S. PATENT DOCUMENTS

| 4,485,630 A | * | 12/1984 | Kenworthy ................. 60/757 |
| 4,950,129 A | | 8/1990 | Patel et al. |
| 5,222,360 A | | 6/1993 | Antuna et al. |
| 5,228,828 A | | 7/1993 | Damlis et al. |
| 5,273,396 A | | 12/1993 | Albrecht et al. |
| 5,281,085 A | | 1/1994 | Lenahan et al. |
| 5,820,024 A | | 10/1998 | Ausdenmoore et al. |
| 5,911,679 A | | 6/1999 | Farrell et al. |
| 6,045,325 A | | 4/2000 | Horvath et al. |
| 6,543,233 B1 | * | 4/2003 | Young et al. ................. 60/752 |
| 2005/0050896 A1 | * | 3/2005 | McMasters ................. 60/752 |

* cited by examiner

*Primary Examiner*—Louis J. Casaregola
(74) *Attorney, Agent, or Firm*—William Scott Andes; Armstrong Teasdale LLP

(57) ABSTRACT

A method facilitates assembling a combustor for a gas turbine engine. The method includes providing a dome assembly that includes at least one cooling slot lip and at least one filler projection, wherein a gap defined between the cooling slot lip and the at least one filler projection has a height defined between cooling slot lip and the at least one filler projection that is substantially uniform through the gap. The method also includes coupling a liner assembly to the dome assembly, such that a combustion chamber is defined by the liner assembly, and coupling an inner and an outer support to the dome assembly, such that the dome assembly extends between the inner and outer supports.

20 Claims, 3 Drawing Sheets

METHODS AND APPARATUS FOR FILM COOLING GAS TURBINE ENGINE COMBUSTORS

STATEMENT REGARDING FEDERALLY SPONSORED RESEARCH OR DEVELOPMENT

The U.S. Government may have certain rights in this invention pursuant to contract number DAAE07-00-C-N086.

BACKGROUND OF THE INVENTION

This invention relates generally to gas turbine engines, more particularly to combustors used with gas turbine engines.

Known turbine engines include a compressor for compressing air which is suitably mixed with a fuel and channeled to a combustor wherein the mixture is ignited within a combustion chamber for generating hot combustion gases. More specifically, at least some known combustors include a dome assembly that channels airflow downstream and circumferentially around each fuel injector. More specifically, at least some known dome assemblies include a swirler assembly that extends upstream from a domeplate, and a baffle that extends downstream from the domeplate and into the combustion chamber.

Within recuperated gas turbine engines, the combustion chamber is defined by multi-holed inner and outer liners that are coupled to the domeplate. The cooling performance of the liners is enhanced by the use of a film cooling starter slot that is defined within the domeplate and is in flow communication with at least one opening extending through the domeplate. The film cooling starter slot channel cooling air exiting the domeplate openings downstream to provide film cooling of an inner surface of the inner and outer liners. Although the film cooling starter slots facilitate changing the direction of the cooling air to facilitate provide film cooling of the inner and outer liners, during certain operational conditions, the configuration of such slots may also enable fuel injected into the combustor to enter the slots. Moreover, the shape of the film cooling slots may also make such slots susceptible to flameholding, which over time, may shorten the useful life of the combustor liners.

BRIEF DESCRIPTION OF THE INVENTION

In one aspect, a method for assembling a combustor for a gas turbine engine is provided. The method includes providing a dome assembly that includes at least one cooling slot lip and at least one filler projection, wherein a gap defined between the cooling slot lip and the at least one filler projection has a height defined between cooling slot lip and the at least one filler projection that is substantially uniform through the gap. The method also includes coupling a liner assembly to the dome assembly, such that a combustion chamber is defined by the liner assembly, and coupling an inner and an outer support to the dome assembly, such that the dome assembly extends between the inner and outer supports.

In another aspect, a combustor for a gas turbine engine is provided. The combustor includes a combustion chamber having a centerline axis extending therethrough, an outer support, an inner support, and a dome assembly. The dome assembly includes a domeplate extending between the inner and outer supports. The domeplate includes at least one cooling slot lip and at least one filler projection. The at least one cooling slot is spaced radially from the at least one filler projection such that a gap is defined between. The gap has a height measured between the at least one cooling slot lip and the at least one filler projection, wherein the gap height is substantially constant through the gap.

In a further aspect of the invention, a gas turbine engine including a combustor is provided. The combustor includes a liner assembly, a combustion chamber, a dome assembly, an outer support, and an inner support. The combustion chamber is defined by the liner assembly. The dome assembly includes a domeplate extending between the inner and outer supports. The domeplate includes at least one cooling slot lip and at least one filler projection. The liner assembly is coupled to the domeplate and contacts the at least one filler projection. The at least one cooling slot is spaced radially from the at least one filler projection such that a gap is defined between. The gap has a height that is measured between the at least one cooling slot lip and the at least one filler projection, wherein the gap height is substantially constant through the gap.

DETAILED DESCRIPTION OF THE INVENTION

Figure 1:
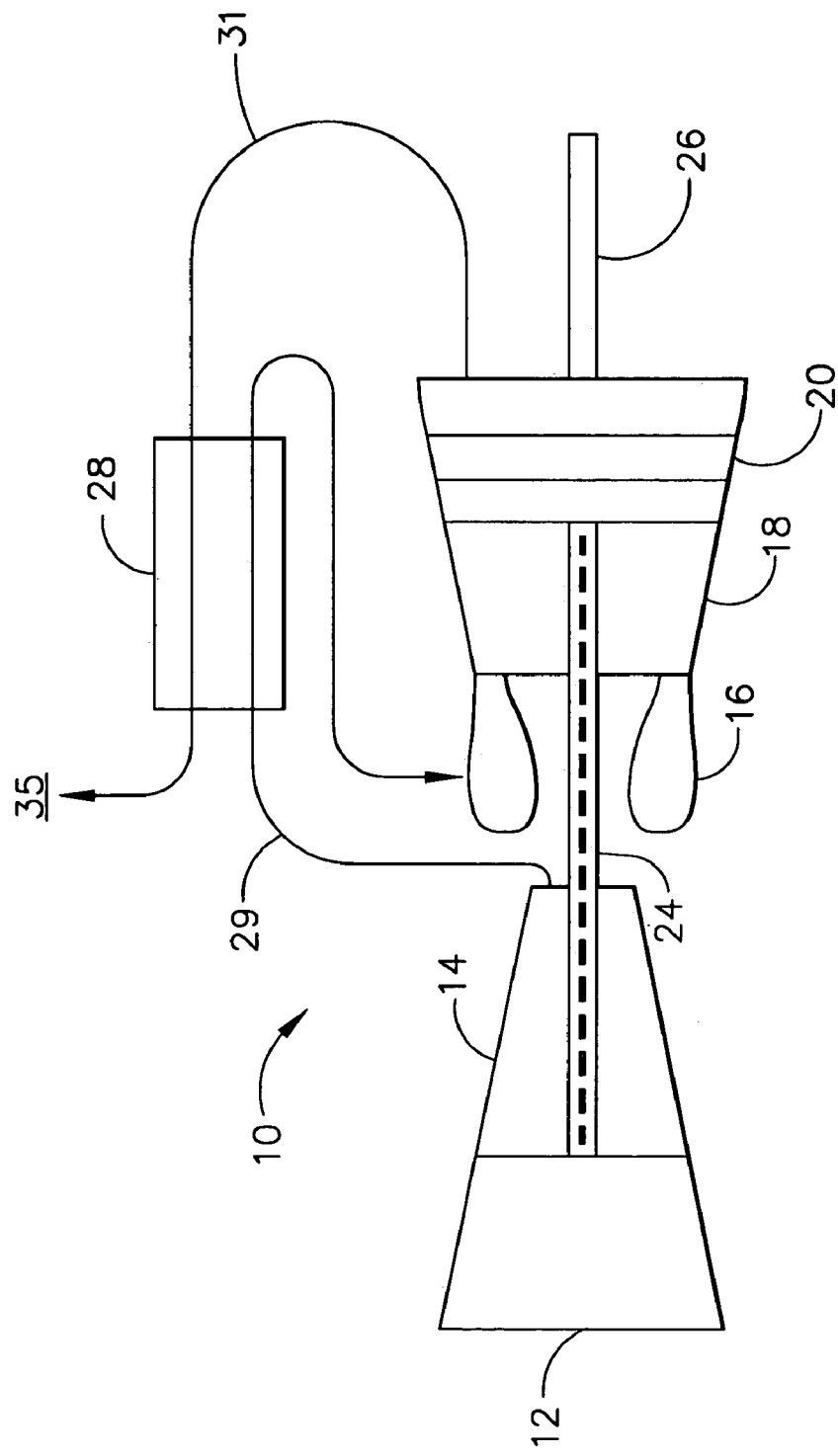
FIG. 1 is a schematic of a gas turbine engine.

FIG. 1 is a schematic illustration of a gas turbine engine 10 including a compressor 14, and a combustor 16. Engine 10 also includes a high pressure turbine 18 and a low pressure turbine 20. Compressor 14 and turbine 18 are coupled by a first shaft 24, and turbine 20 drives a second output shaft 26. Shaft 26 provides a rotary motive force to drive a driven machine, such as, but, not limited to a gearbox, a transmission, a generator, a fan, or a pump. Engine 10 also includes a recuperator 28 that has a first fluid path 29 coupled serially between compressor 14 and combustor 16, and a second fluid path 31 that is serially coupled between turbine 20 and ambient 35. In one embodiment, the gas turbine engine is an LV100 engine available from General Electric Company, Cincinnati, Ohio. In the exemplary embodiment, engine 10 includes a compressor 14 coupled by a first shaft 24 to turbine 18, and a powertrain and turbine 20 are coupled by a second shaft 26.

In operation, air flows through compressor 14. The highly compressed air is delivered to recuperator 28 where hot exhaust gases from turbine 20 transfer heat to the compressed air. The heated compressed air is delivered to combustor 16. Airflow from combustor 16 drives turbines 18 and 20 and passes through recuperator 28 before exiting gas turbine engine 10. In the exemplary embodiment, during operation, air flows through compressor 14 and the highly compressed recuperated air is delivered to combustor 16.

Figure 2:
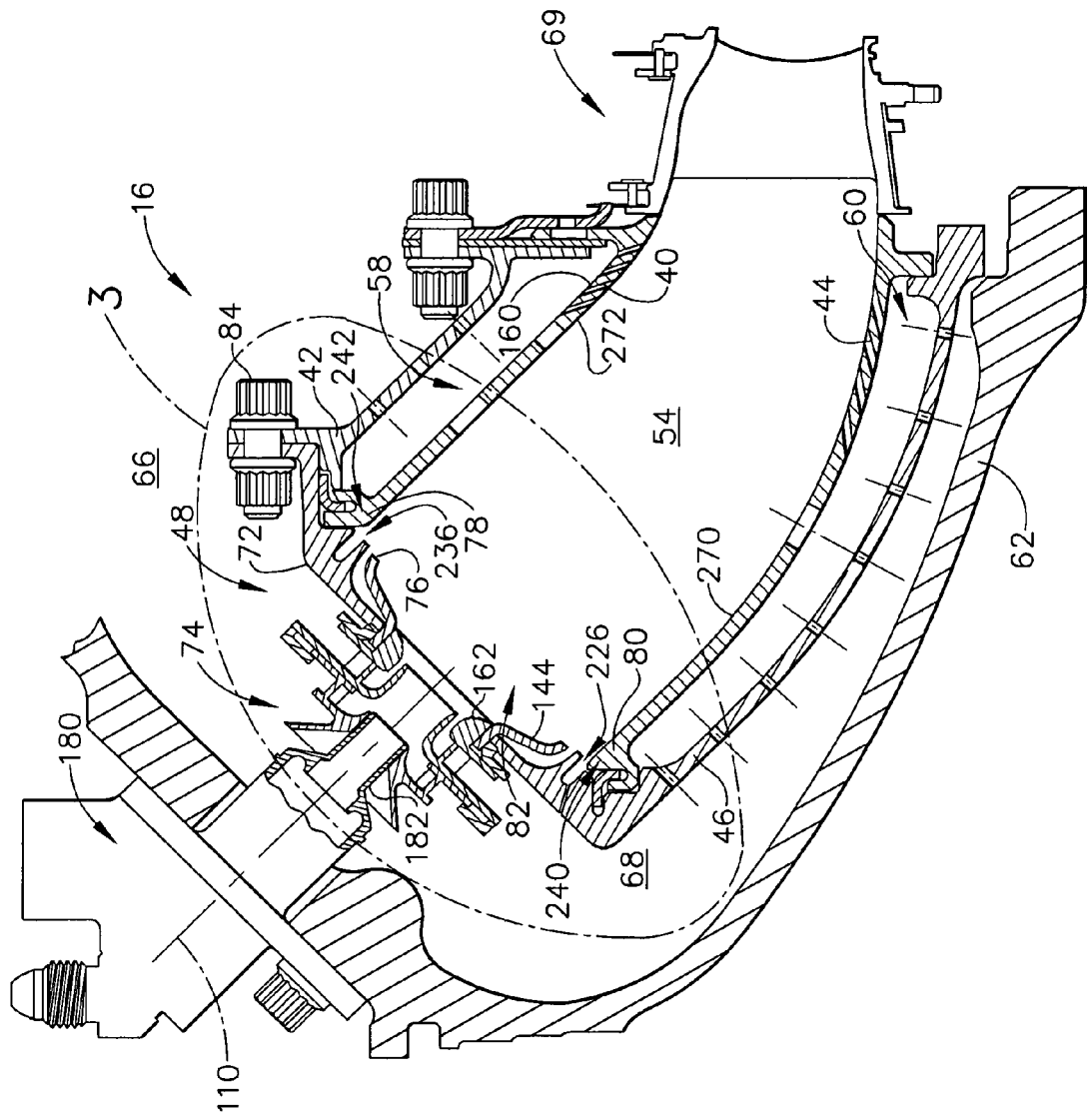
FIG. 2 is a cross-sectional illustration of a portion of a combustor used with the gas turbine engine shown in FIG. 1.
Figure 3:
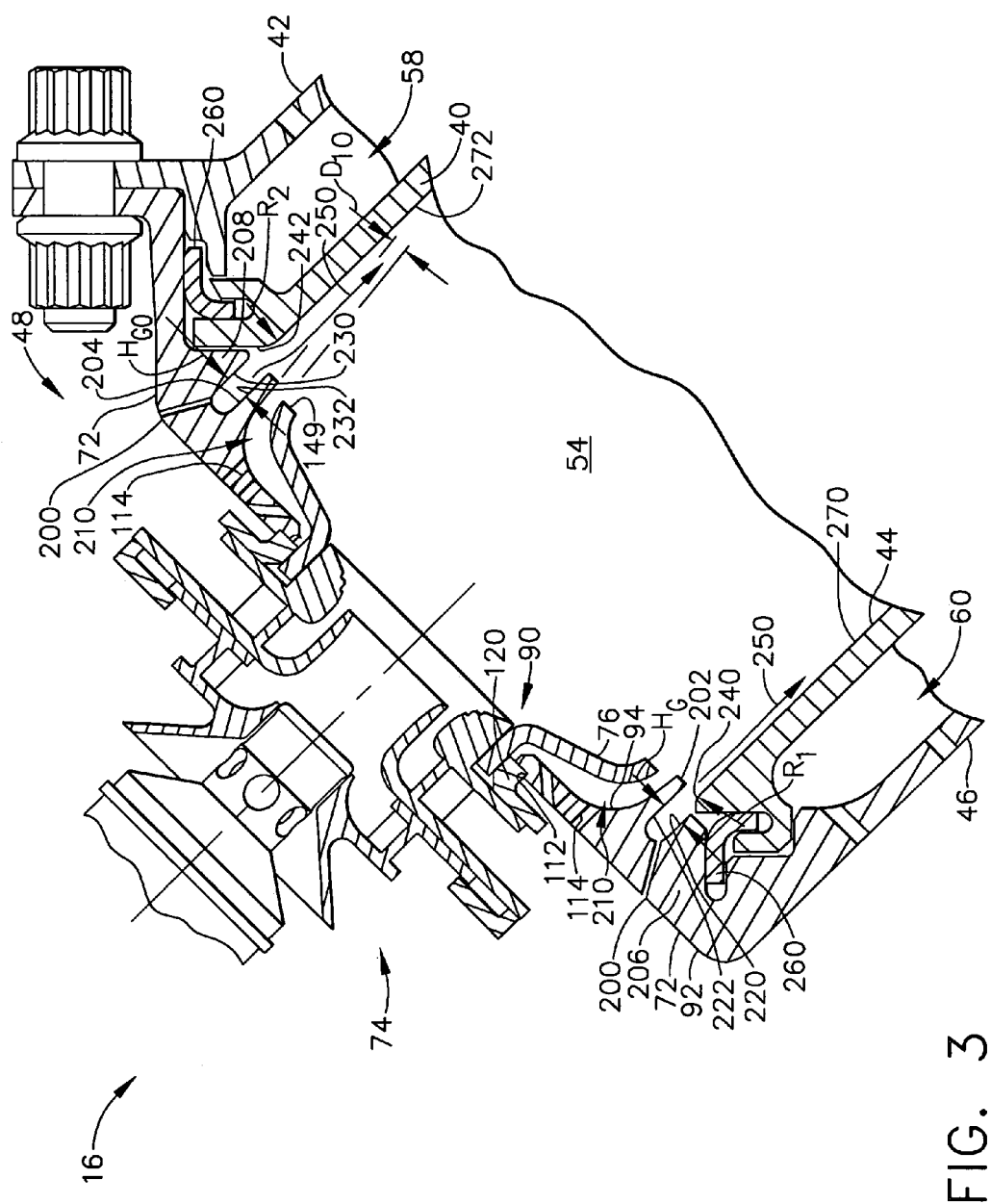
FIG. 3 is an enlarged view of a portion of the combustor shown in FIG. 2 and taken along area 3.

FIG. 2 is a cross-sectional illustration of a portion of combustor 16. FIG. 3 is an enlarged view of a portion of combustor 16 taken along area 3. Combustor 16 also includes an annular outer liner 40, an outer support 42, an annular inner liner 44, an inner support 46, and a dome 48 that extends between outer and inner liners 40 and 44, respectively.

Outer liner 40 and inner liner 44 extend downstream from dome 48 and define a combustion chamber 54 therebetween. Combustion chamber 54 is annular and is spaced radially between from liners 40 and 44. Outer support 42 is coupled to outer liner 40 and extends downstream from dome 48. Moreover, outer support 42 is spaced radially outward from outer liner 40 such that an outer cooling passageway 58 is defined therebetween. Inner support 46 also is coupled to, and extends downstream from, dome 48. Inner support 46 is spaced radially inward from inner liner 44 such that an inner cooling passageway 60 is defined therebetween. Accordingly, when assembled, each liner 40 and 44 is radially unconstrained by any combustor support structure.

Outer liner 40 and inner liner 44 are spaced radially within a combustor casing 62. Combustor casing 62 is generally annular and extends around combustor 16. More-specifically, outer support 42 and combustor casing 62 define an outer passageway 66 and inner support 46 and combustor casing 62 define an inner passageway 68. Outer and inner liners 40 and 44 extend to a turbine nozzle 69 that is downstream from liners 40 and 44.

Combustor dome assembly 48 includes an annular domeplate 72, a swirler assembly 74, and a baffle 76. Domeplate 72 is coupled to an upstream end 78 and 80 of outer and inner liners 40 and 44, respectively, such that domeplate 72 defines an upstream end 82 of combustion chamber 54. In the exemplary embodiment, inner support 46 is formed integrally with domeplate 72, and outer support 42 is coupled to domeplate 72 by at least one coupling member 84.

A plurality of cooling openings 114 extend through domeplate 72 between upstream and downstream sides 92 and 94, respectively of domeplate 72. Openings 114 are obliquely oriented with respect to center axis 110 and facilitate channeling cooling air through domeplate 72 to facilitate impingement cooling of baffle 76.

Baffle 76 is coupled to an annular sealplate 120 and extends divergently downstream from domeplate 72 into combustion chamber 54. In the exemplary embodiment, a radially inner surface or flowpath surface 144 of baffle 76 is coated with a layer of thermal barrier coating (TBC).

Baffle upstream end 142 is coupled to sealplate 120 as described above. A downstream end 149 of baffle 76 is flared to facilitate channeling fuel injected into combustor 16 downstream and into combustion chamber 54, as described in more detail below. Swirler assembly 74 is coupled to sealplate 120 such that swirler assembly 74 is substantially concentrically aligned with respect to sealplate 120.

Fuel is supplied to combustor 16 through a fuel injection assembly 180 that includes a plurality of circumferentially-spaced fuel nozzles 182 that extend through swirler assembly 74 into combustion chamber 54.

In addition to openings 114, domeplate 72 also includes a plurality of film cooling openings 200, an inner film cooling lip 202, an outer film cooing lip 204, an inner filler projection 206, and an outer filler projection 208. Openings 200 extend through domeplate 72 between upstream and downstream sides 92 and 94, respectively, and radially positioned between baffle cooling openings 114 and each support 42 and 46.

Inner film cooling lip 202 is formed integrally with domeplate 72 and extends inward from domeplate downstream side 94 towards combustion chamber 54. More specifically, inner film cooling lip 202 extends downstream between baffle 76 and inner liner 44. Similarly, outer film cooling lip 204 is formed integrally with domeplate 72 and extends inward from domeplate downstream side 94 towards combustion chamber 54, such that outer film cooling lip 204 is between baffle 76 and outer liner 40.

Each cooling lip 202 and 204 is spaced a radial distance $D_{10}$ from baffle 76 such that an effectively annular gap or baffle cooling air slot 210 is defined between baffle 76 and each cooling lip 202 and 204. Baffle gap 210 is in flow communication with domeplate openings 114 such that impingement air discharged from openings 114 is channeled through baffle gap 210 and discharged into combustion chamber 54 past baffle flared end 149. Additionally, baffle flared end 149 facilitates channeling fuel discharged from fuel nozzles 182 downstream into combustion chamber 54, such that fuel is directed away from cooling slots 226 and 236, and cooling lips 202 and 204.

Each filler projection 206 and 208 is formed integrally with domeplate 72 and extends inward from domeplate downstream side 94 towards combustion chamber 54. More specifically, inner filler projection 206 extends downstream between inner film cooling lip 202 and inner support 46. More specifically, inner filler projection 206 includes a radially inner wall 220 that is spaced a radial distance from a radial outer wall 222 of inner cooling lip 202 such that an inner film cooling slot 226 is defined between inner filler projection 206 and inner film cooling lip 202. A height $H_G$ of inner cooling slot 226 measured between walls 222 and 220 is substantially constant through slot 226.

Filler projection 208 extends inward from domeplate downstream side 94 towards combustion chamber 54 and is positioned between outer film cooling lip 204 and outer support 42. More specifically, outer filler projection 208 also includes a radially outer wall 230 that is spaced a radial distance from a radial inner wall 232 of outer cooling lip 204 such that an outer film cooling slot 236 is defined between outer filler projection 208 and outer film cooling lip 204. A height $H_{GO}$ of outer cooling slot 236 measured between walls 232 and 230 is substantially constant through slot 236. Baffle flared end 149 facilitates channeling fuel discharged from fuel nozzles 182 downstream into combustion chamber 54, such that fuel is directed away from cooling slots 226 and 236.

Inner and outer liners 44 and 40, respectively, are each coupled to domeplate 72 such that a leading edge 240 and 242 of each respective liner 44 and 40 is in flow communication with, and axially downstream from, each respective film cooling slot 226 and 236. Additionally, in the exemplary embodiment, outer liner 40 is coupled against outer filler projection 208. Moreover, each liner leading edge 240 and 242 is formed with a radius of curvature $R_1$ and $R_2$, such that each leading edge 240 and 242 defines a blended forward facing step for film cooling air 250 discharged from slots 226 and 236. Accordingly, when assembled, each liner 40 and 44 is radially unconstrained by any combustor support structure. More specifically, each radius of curvature $R_1$ and $R_2$ facilitates liners 44 and 40 accommodating mechanical and thermal mismatches between liners 44 and 40 and respective slots 226 and 236.

A seal member 260 extends between each liner 40 and 44 and each respective support 42 and 46, to facilitate minimizing leakage around liners 40 and 44. In the exemplary embodiment, seal member 260 is an L-seal.

During assembly of combustor 16, initially domeplate 72 is machined from a near net shape forging. Filler material may be added to domeplate 72 to create filler projections 206 and 208. Projections 206 and 208 create a desired cooling slot height $H_{GO}$ for outer cooling slot 236 and $H_G$ for inner cooling slot 226, that is substantially constant through each respective slot 236 and 226. In the exemplary embodiment, the height of each cooling slot 226 and 236 is the same. Moreover, the filler material also creates a smooth cooling flow transition onto a flow surface 270 and 272 of respective inner and outer liners 44 and 40. Furthermore, the filler material also facilitates shielding seal member 260 from flame radiation generated within combustion chamber 54.

During operation, cooling air is supplied to film cooling slots 226 and 236 from domeplate openings 200. Cooling air 250 is then channeled through slots 226 and 236 and discharged towards liner leading edges 240 and 242. The forward facing step created by the rounded leading edges 240 and 242 facilitates providing a smooth transition from slots 226 and 236 to liner flow surfaces 270 and 272 under all engine operating conditions. More specifically, each slot 226 and 236 are sized and positioned such that each rounded liner leading edge 240 and 242 always provides a forward facing step for film cooling air 250.

The combination of each cooling slot height $H_{GO}$ and $H_G$, and the orientation of each slot 236 and 226 with respect to swirler assembly 74 facilitates preventing flame holding which may occur in other known dome assemblies if fuel becomes entrained in cooling film 250. Moreover, because each slot height $H_{GO}$ and $H_G$, is substantially constant, a velocity and pressure of cooling air entering film cooling slots 226 and 236 is maintained such that cooling air 250 discharged from slots 226 and 236 is always discharged at a higher pressure and velocity than a turbulent flame speed generated within combustion chamber 54. Accordingly, the substantially constant heights $H_{GO}$ and $H_G$, further facilitate preventing flame holding within slots 226 and 236.

The above-described combustor dome assemblies provide a cost-effective and reliable means for operating a combustor. More specifically, each assembly includes a domeplate that is formed with integral film cooling slots that discharge cooling air for film cooling of combustor liners, and in particular, combustor liners that are not integral with the domeplate. The slots are formed with a substantially constant height, which in combination with the orientation of the slot relative to the dome assembly facilitates preventing flame holding within the film cooling slots should fuel become entrained in the cooling film, and also facilitates protecting liner seals from exposure to flame radiation. As a result, a combustor assembly is provided which satisfies pre-determined combustor life requirements while maintaining pre-determined operational requirements.

An exemplary embodiment of a combustor dome assembly is described above in detail. The combustor dome assembly components illustrated are not limited to the specific embodiments described herein, but rather, components of each dome assembly may be utilized independently and separately from other components described herein. For example, the dome assembly components described above may also be used in combination with other engine combustion systems.

While the invention has been described in terms of various specific embodiments, those skilled in the art will recognize that the invention can be practiced with modification within the spirit and scope of the claims.

What is claimed is:

1. A method for assembling a combustor for a gas turbine engine, said method comprising:

providing a dome assembly that includes at least one cooling slot lip and at least one filler projection, wherein a gap defined between the cooling slot lip and the at least one filler projection has a height defined between said at least one cooling slot lip and the at least one filler projection that is substantially uniform through the gap;

coupling a liner assembly to the dome assembly, such that a combustion chamber is defined by the liner assembly; and coupling an inner and an outer support to the dome assembly, such that the dome assembly extends between the inner and outer supports.

2. A method in accordance with claim 1 further comprising coupling an upstream end of a baffle to the dome assembly such that the baffle extends downstream from the dome assembly into the combustion chamber, and wherein a downstream end of the baffle is flared to facilitate channeling fuel injected into the combustion chamber away from the dome assembly gap.

3. A method in accordance with claim 1 wherein coupling a liner assembly to the dome assembly further comprises:

coupling an inner liner to the dome assembly such the inner liner is spaced radially outward from the inner support; and coupling an outer liner to the dome assembly such that the outer liner is spaced radially inward from the outer support, wherein at least one of the inner and outer liners includes a leading edge formed with a predetermined radius of curvature.

4. A method in accordance with claim 1 wherein coupling a liner assembly to the dome assembly further comprises:

coupling an inner liner to the dome assembly such the inner liner is spaced radially outward from the inner support; and coupling an outer liner to the dome assembly such that the outer liner is spaced radially inward from the outer support, wherein at least one of the inner and outer liners includes a leading edge that is positioned downstream from the gap such that the leading edge forms a forward facing step for flow discharged from the gap.

5. A method in accordance with claim 1 wherein coupling a liner assembly the dome assembly further comprises coupling a seal member between the liner assembly and at least one of the inner support and the outer support, such that the at least one filler projection facilitates shielding the seal member from flame radiation generated within said combustion chamber.

6. A combustor for a gas turbine engine, said combustor comprising:

a combustion chamber having a centerline axis extending therethrough;

an outer support;

an inner support; and a dome assembly comprising a domeplate extending between said inner and outer supports, said domeplate comprising at least one cooling slot lip, and at least one filler projection, said at least one cooling slot lip spaced radially from said at least one filler projection such that a gap is defined between, said gap having a height measured between said at least one cooling slot lip and said at least one filler projection, said gap height substantially constant through said gap.

7. A combustor in accordance with claim 6 further comprising a baffle comprising an upstream end, a downstream end, and a divergent body extending therebetween, said upstream end coupled to said domeplate, said downstream end flared to facilitate directing fuel injected to said combustion chamber away from said gap.

8. A combustor in accordance with claim 6 wherein said baffle is spaced radially inward from said film cooling lip such that a slot is defined therebetween, said slot for channeling cooling air therethrough into said combustion chamber.

9. A combustor in accordance with claim 6 further comprising an inner liner and an outer liner, said outer liner coupled to said domeplate and radially inward from said outer support, said inner liner coupled to said domeplate and radially outward from said inner support, said combustion chamber defined between said inner and outer liners.

10. A combustor in accordance with claim 9 wherein at least one of said inner liner and said outer liner comprises a leading edge that is coupled downstream from said gap, said leading edge comprising a radius.

11. A combustor in accordance with claim 9 wherein at least one of said inner liner and said outer liner comprises a leading edge that forms a forward facing step for flow discharged from said gap.

12. A combustor in accordance with claim 9 wherein said gap discharges cooling air therefrom for film cooling at least one of said inner liner and said outer liner, said gap height selected to facilitate discharging cooling air from said gap at a velocity that is higher than a turbulent flame speed generated within said combustion chamber.

13. A combustor in accordance with claim 9 wherein said dome assembly further comprises at least one seal extending between at least one of said inner and outer liners and at least one of said inner and outer supports, said at least one filler projection facilitates sheilding said at least one seal from flame radiation generated within said combustion chamber.

14. A gas turbine engine comprising a combustor comprising a liner assembly, a combustion chamber, a dome assembly, an outer support, and an inner support, said combustion chamber defined by said liner assembly, said dome assembly comprising a domeplate extending between said inner and outer supports, said domeplate comprising at least one cooling slot lip, and at least one filler projection, said liner assembly coupled to said domeplate in contact with said at least one filler projection, said at least one cooling slot lip spaced radially from said at least one filler projection such that a gap is defined between, said gap having a height measured between said at least one cooling slot lip and said at least one filler projection, said gap height substantially constant through said gap.

15. A gas turbine engine in accordance with claim 14 wherein said combustor liner assembly comprises an inner liner and an outer liner, each of said inner and outer liners coupled to said domeplate, said inner liner spaced radially inward of said outer liner to define said combustion chamber therebetween.

16. A gas turbine engine in accordance with claim 15 wherein at least one of said inner liner and said outer liner comprises a leading edge comprising a radius, said leading edge downstream from said gap such said leading edge forms a forward facing step for flow discharged from said gap.

17. A gas turbine engine in accordance with claim 14 wherein said gap discharges cooling air therefrom for film cooling at least a portion of said liner assembly, said gap height selected to facilitate discharging cooling air from said gap at a velocity that is higher than a turbulent flame speed generated within said combustion chamber.

18. A gas turbine engine in accordance with claim 14 wherein said combustor further comprises a divergent baffle extending downstream from said domeplate into said combustion chamber, said baffle comprising a flared downstream end and an upstream end coupled to said domeplate, said baffle downstream end facilitates directing fuel injected to said combustion chamber away from said domeplate gap.

19. A gas turbine engine in accordance with claim 14 wherein said combustor further comprises a baffle coupled to said domeplate such that a baffle gap is defined between said film cooling lip and said baffle, said baffle gap for channeling cooling air therethrough into said combustion chamber.

20. A gas turbine engine in accordance with claim 14 wherein said combustor dome assembly further comprises at least one seal extending between said liner assembly and at least one of said inner and outer supports, said at least one filler projection facilitates sheilding said at least one seal from flame radiation generated within said combustion chamber.

* * * * *

UNITED STATES PATENT AND TRADEMARK OFFICE
CERTIFICATE OF CORRECTION

| | | |
|---|---|---|
| PATENT NO. | : 7,051,532 B2 | Page 1 of 1 |
| APPLICATION NO. | : 10/688526 | |
| DATED | : May 30, 2006 | |
| INVENTOR(S) | : Howell et al. | |

It is certified that error appears in the above-identified patent and that said Letters Patent is hereby corrected as shown below:

In Claim 13, column 7, line 28, delete "sheilding" and insert therefor -- shielding --.
In Claim 20, column 8, line 36, delete "sheilding" and insert therefor -- shielding --.

Signed and Sealed this

Thirteenth Day of November, 2007

JON W. DUDAS
*Director of the United States Patent and Trademark Office*